United States Patent

Nishikawa

[11] Patent Number: 6,108,009
[45] Date of Patent: *Aug. 22, 2000

[54] IMAGE PROCESSING METHOD AND APPARATUS FOR PREVIEWING COLOR IMAGES

[75] Inventor: Naoyuki Nishikawa, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,906

[22] Filed: Feb. 7, 1997

Related U.S. Application Data

[63] Continuation of application No. 08/379,754, Jan. 27, 1995, abandoned.

[30] Foreign Application Priority Data

Jan. 31, 1994 [JP] Japan .................................. 6-009887

[51] Int. Cl.[7] .................................................. G06T 11/40
[52] U.S. Cl. ............................................ 345/431; 345/428
[58] Field of Search .................................... 395/128, 131, 395/132, 139; 358/500–503, 515, 518–521, 530–540; 345/428, 431, 432, 439

[56] References Cited

U.S. PATENT DOCUMENTS

| | | | |
|---|---|---|---|
| 5,081,529 | 1/1992 | Collette | 358/80 |
| 5,257,097 | 10/1993 | Pineau et al. | 358/500 |
| 5,363,318 | 11/1994 | McCauley | 364/571.01 |
| 5,377,025 | 12/1994 | Spaulding et al. | 358/518 |
| 5,416,890 | 5/1995 | Berettal | 395/131 |
| 5,448,381 | 9/1995 | Bohan et al. | 358/527 |

FOREIGN PATENT DOCUMENTS

| | | |
|---|---|---|
| 0534871 | 3/1993 | European Pat. Off. . |
| 0537887 | 4/1993 | European Pat. Off. . |
| 401147777A | 6/1989 | Japan . |
| 402239957A | 9/1990 | Japan . |
| 404024771A | 1/1992 | Japan . |
| 404100376A | 4/1992 | Japan . |

*Primary Examiner*—Mark K. Zimmerman
*Assistant Examiner*—Mano Padmanabhan
*Attorney, Agent, or Firm*—Fitzpatrick, Cella, Harper & Scinto

[57] ABSTRACT

An improved previewing technique of displaying an image on a monitor prior to a printer printing the image. The image signal for driving the monitor is generated based on predetermined printer parameters. The printer parameters include the printer resolution (dots/inch) and/or the number of printable tonal levels or gradations, in addition to the printer color gamut.

17 Claims, 13 Drawing Sheets

IMAGE PROCESSING METHOD AND APPARATUS FOR PREVIEWING COLOR IMAGES

This application is a continuation of Application No. 08/379,754 filed Jan. 27, 1995, now abandoned.

BACKGROUND OF THE INVENTION

1. Field of the Invention

This invention is related to an image processing method and apparatus, and in particular to a method and apparatus for displaying an image on a monitor before printing.

2. Related Art

Recently, color image processing systems have come into wide use, so that monochrome printers are being replaced by color printers. As a result, the problem of an image on a monitor display not exactly matching the image output by the color printer, has become important.

One of the reasons for this problem is that a color printed by the color printer is not necessarily the same as the (ostensibly) same color displayed on the color monitor. Research to solve this aspect of the problem, by ensuring that the color displayed on the color monitor and the color actually printed by a color printer, match, has recently been widely pursued.

To this end, research for an adequate preview function (that is, the function of displaying a probable printing color, on the basis of a prediction of how the desired color will be printed by the color printer) has been carried out. A "masking method" and a "look up table method" are examples of well-known techniques. As a result, it is possible to get a better quality image by color image processing than before.

However, even with such processing, it is hard to get a more precise preview image, in a case where the kind of output device (printing device) to be used, is changed.

SUMMARY OF THE INVENTION

An object of the present invention is to improve the quality of a preview image.

Another object of the present invention is to provide a method and apparatus for generating an improved preview image.

According to one aspect of the present invention, there is provided an image processing method for obtaining a preview image that corresponds to an output image to be produced based on given image data by an image producing device, comprising the steps of (i) inputting information that represents a resolution or a number of tonal levels of the image producing device; and (ii) obtaining preview image data to produce the preview image in accordance with the information.

According to another aspect of the present invention, there is provided an image processing apparatus for obtaining a preview image that corresponds to an output image to be produced based on given image data by an image producing device, comprising (i) inputting means for inputting information that represents a resolution or a number of tonal levels of the image producing device and (ii) obtaining means for obtaining preview image data to produce the preview image in accordance with the information.

Another object of the present invention is to provide a system that will improve the quality of a preview image.

Another object of the present invention is to provide software for a computer that will improve the accuracy of a preview image generated by the computer.

The foregoing and still other objects and advantages of the present invention will become fully apparent from the following description of the preferred embodiments, taken in conjunction with the attached drawings.

DETAILED DESCRIPTION OF THE PRESENT EMBODIMENTS

The cause of the above-described shortcoming, as analyzed by the inventor, is considered to be the difference between the image recording methods of ink jet printers and color laser printers.

Figure 1:
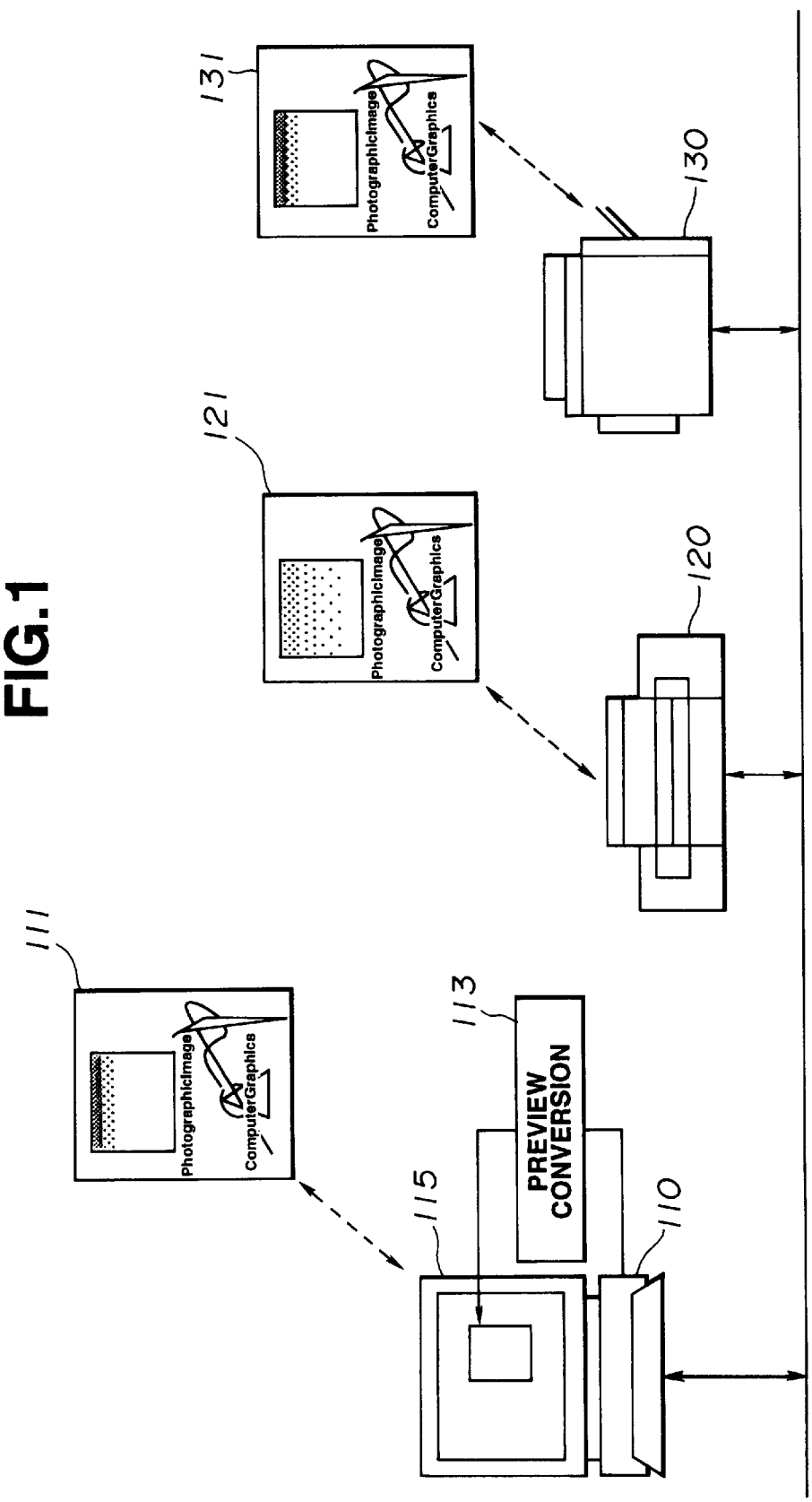
FIG. 1 is a diagram for explaining the inventor's analysis of the problem solved by the present invention.

Referring to FIG. 1, the monitor 115 and the color laser printer 130 are multivalue output devices, while the color ink printer 120 is a binary output device. The monitor 115 displays a preview image 111 processed by a computer 110. The characteristics of these output devices are as follows.

(1) Multivalue Output Devices

The monitor 115 and the color laser printer 130 produce the color image 131 using 256 tones (density levels) for each color component (red, green, blue; "R.G.B") per pixel.

(2) Binary Output Device

The color ink jet printer 120, in contrast, produces the color image 121 using only 2 tones for each color component R.G.B. per pixel.

To operate the binary output device, a halftoning process, typically as a dither method or an error diffusion method, is used. In the halftoning process, a noise component is added to image data to be displayed. The following is clear from the inventor's analysis: the noise added in the halftoning process influences the visual impression made by the image 121 produced by the color ink jet printer 120. More generally, it may be said that the difference in image resolution between these devices, gives rise to an error in the color shown in a preview image.

The preferred embodiments, based on the inventor's analysis, are as follows.

Figure 2:
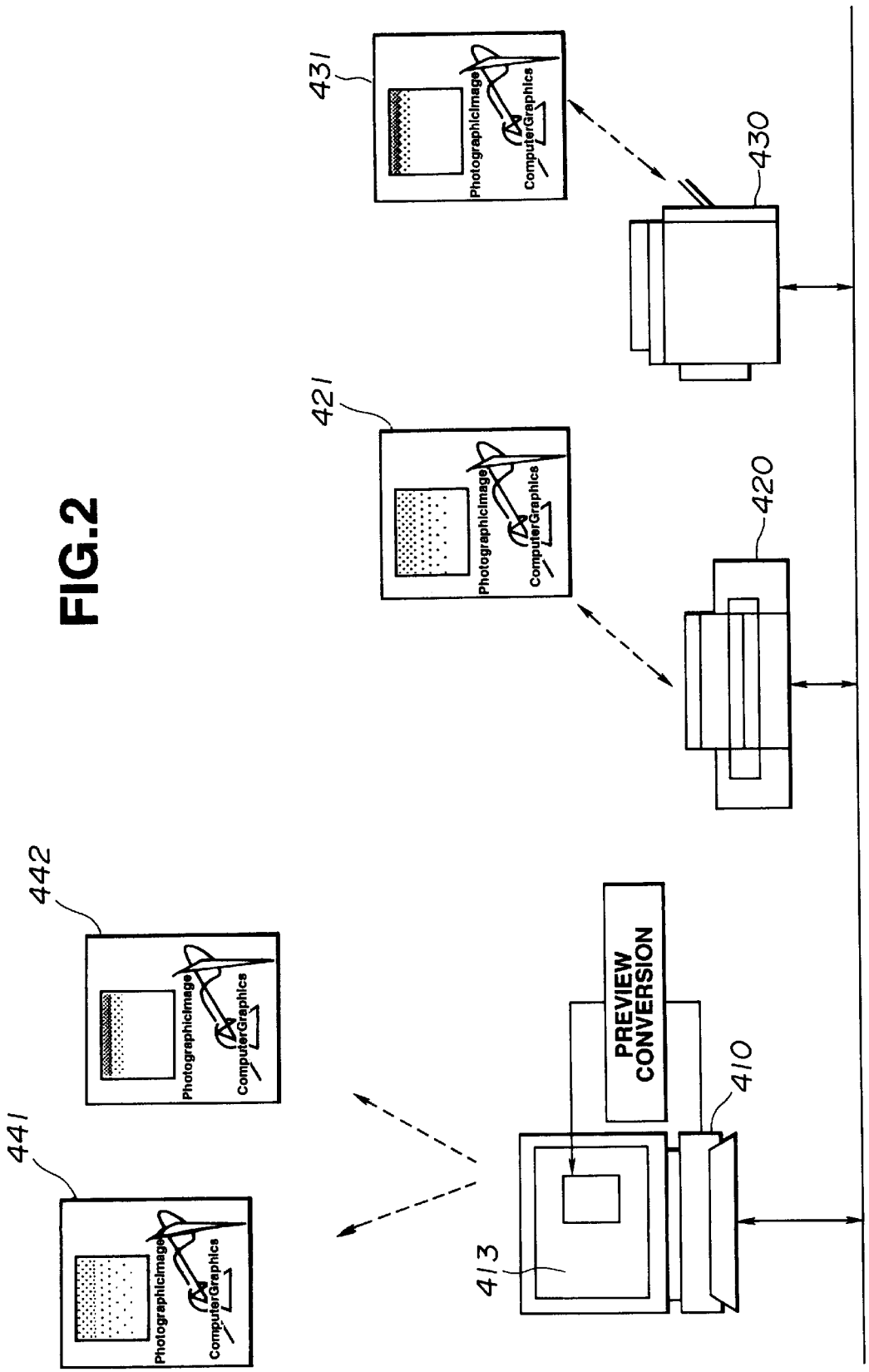
FIG. 2 is a block diagram of a first preferred embodiment of the invention.

FIG. 2 is a block diagram of the first preferred embodiment.

This embodiment has a preview function for changing over the developing process between (a) using the color laser printer and (b) using the color ink jet printer.

Referring to FIG. 2, 410 is a host computer for generating a color image. 413 is a monitor display for displaying a generated color image. 420 is an ink jet color printer for receiving color image data from the host computer 410 and for printing a color image based on the received color image data. 421 is a color print output by the ink jet color printer 420. 430 is a color laser printer for receiving color image data and for printing a color image based on the received color image data. 431 is a color print output by the color laser printer 430.

441 is a picture displayed on the monitor 413, predicting a color image to be printed by the ink jet color printer 420, and 442 is a picture displayed on the monitor 413, predicting a color image to be printed by the color laser printer 430.

Figure 3:
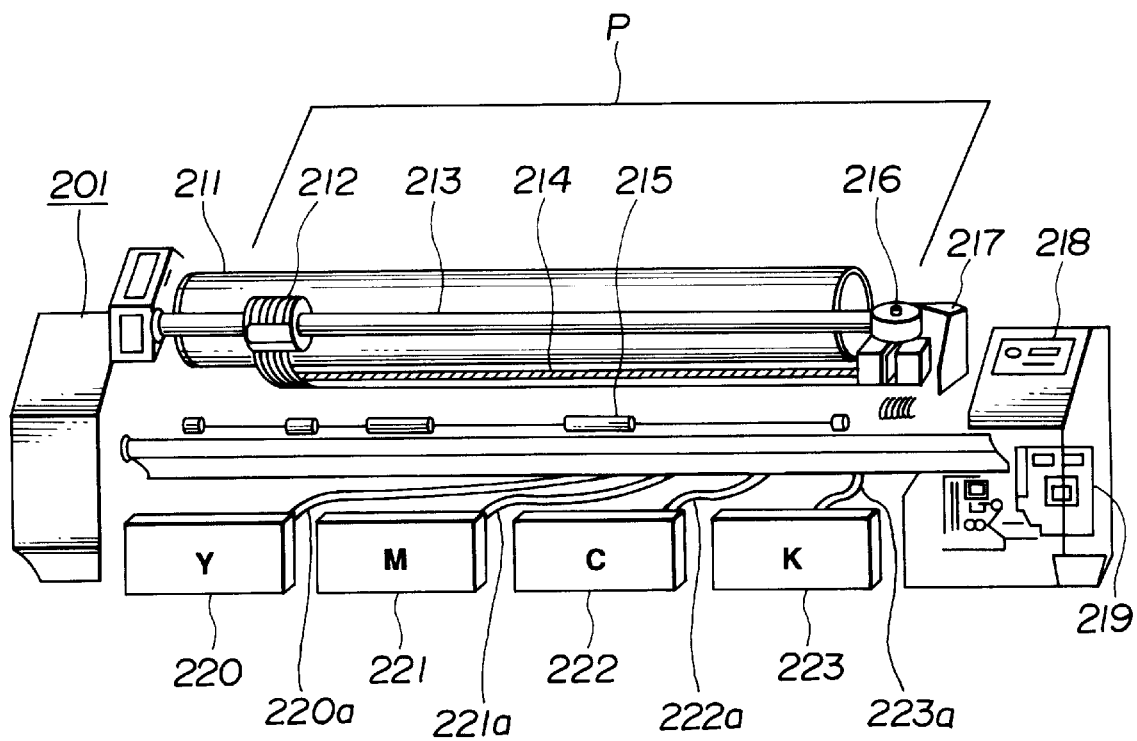
FIG. 3 is a perspective view of the ink jet color printer 420 shown in FIG. 2.

FIG. 3 is a perspective view of the ink jet color printer 420.

Referring to FIG. 3, 201 is the body of the ink jet color printer 420, and 211 is a platen for paper P. 212 is an ink jet printing head for depositing ink on the paper P. 213 is a guide member for guiding the ink jet head 212. 214 is a pipe for conducting ink from a pump 217 to the ink jet head 212. 215 is a front guide controller for guiding the paper P along the platen 211. 216 is a driver for driving the guide member 213 so that the ink jet head 212 moves right and left along the guide member 213. Pump 217 is for conducting ink from cartridges 220 to 223 to the ink jet head 212. 218 is a control panel by means of which an operator enters instructions to control the operation of the ink jet printer 420. 219 is a control board which directly controls the operation of the ink jet printer 420. The control board 219 also converts input R.G.B. image data into Y.M.C.Bk (yellow, magenta, cyan, black) image data to drive the ink jet head 212 by color image processing that will be explained below.

220 to 223 are color ink jet cartridges, respectively containing yellow, magenta, cyan and black ink. Each cartridge has a pipe 220a to 223a, respectively, that connects the cartridge to a pressure pump 216.

The control board 219 receives an instruction and color image data from the host computer 410, and controls the above-mentioned elements to print a color image based on the received color image data.

Color Image Processing In The Ink Jet Color Printer

The color image processing for the printer 120 is explained by reference to FIG. 4.

Figure 4:
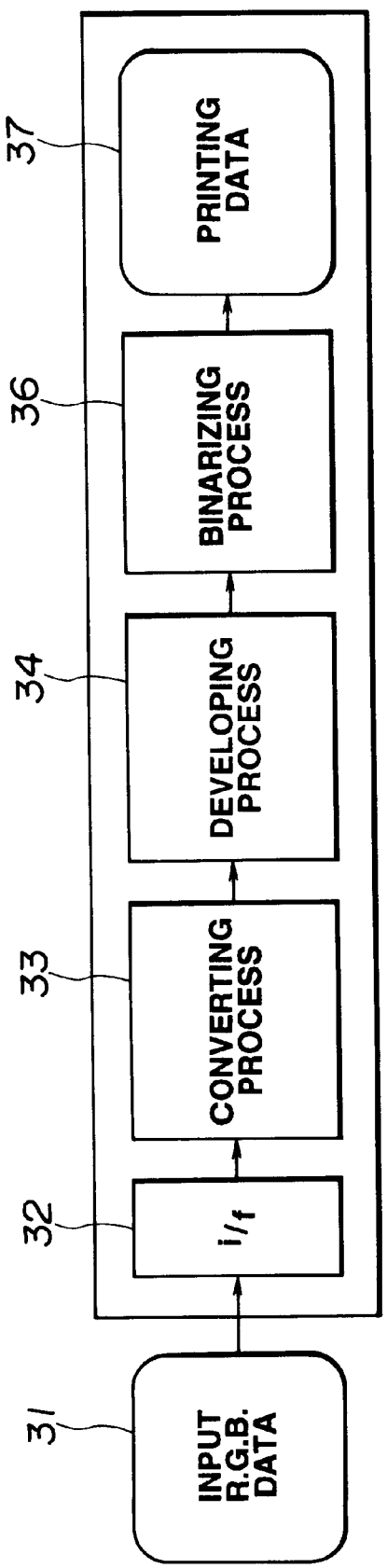
FIG. 4 is a block diagram for explaining the color image processing performed by the ink jet color printer 420.

FIG. 4 is a block diagram for explaining the color image processing for ink jet printer 420. 31 is input R.G.B. color image data.

The R.G.B. color image data 31 is input into the control board 219 through interface 32, and converted into Y.M.C.Bk color image data by converting process 33. The Y.M.C.Bk color image data is developed into dot image data by the developing process 34.

The dot image data is binarized by an artificial half toning process, such as the dither method or the error diffusion method, by the binarizing process 36, and is output as printing data.

The processes 32, 33, 34 and 36 are performed by hardware or software (printer driver).

Figure 5:
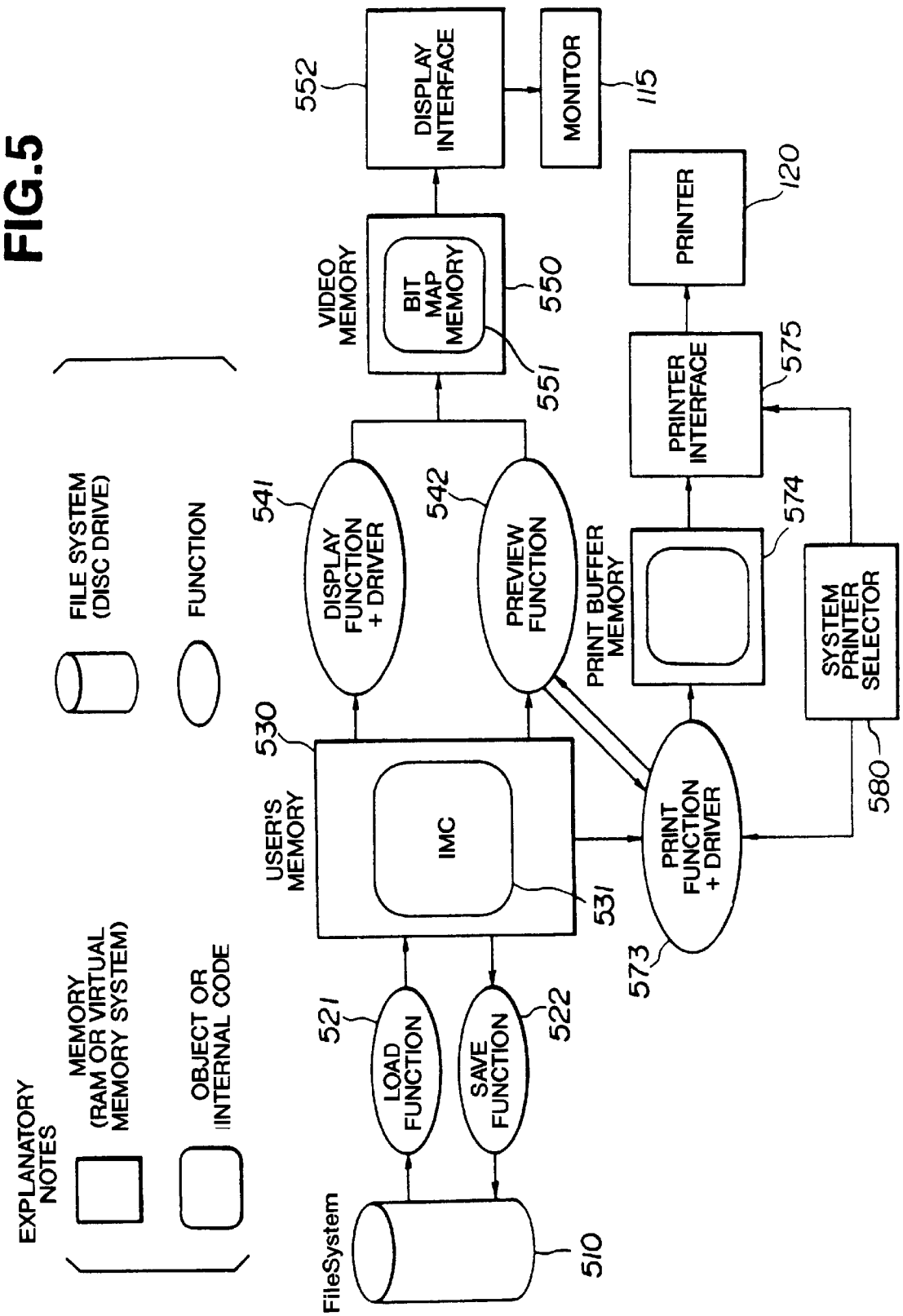
FIG. 5 is a block diagram illustrating the operation of the host computer shown in FIG. 2.

FIG. 5 is a block diagram of the operation of the host computer 410 for explaining processing performed in this embodiment. In FIG. 5, the explanatory notes show the kind of elements included in each portion.

510 is a file system, and 521 is a load function for loading data from the file system into a user's memory 530. 522 is a save function for saving data from the user's memory 530 to file system 510. 531 is color image data stored by the memory 530. 541 is a display function plus driver for converting the color image data stored by the memory 530 into data suitable to drive a monitor 115. 542 is a preview function for predicting color image data from the color image data 531 so as to display a color image corresponding to a color image about to be printed. 550 is a video memory that comprises a bit map memory 551. 552 is a display interface for interfacing between the monitor display 115 and the video memory 550. 573 is a print function and driver for converting the color image data 573 into data suitable to be output to the printer 120.

574 is a print buffer memory for storing the image data converted by the print function and driver 573. 575 is a printer interface for interfacing between the print buffer memory 574 and the printer 120. 580 is a system printer for changing over the print function and driver 573.

The operation of the structure shown in FIG. 5 will now be explained.

a) The color image data to be processed is loaded in user's memory 530 from a file system 510 through the load function 521.

b) The color image data 531 stored by the user's memory 530 is edited by an editing function, or is saved in the file system 510 if necessary.

c) In order to display a color image on the monitor display 115 in the usual manner the color image data stored by the user's memory 530 is processed by the display function and driver 541 and is written in the bit map memory 551. After that the color image data stored by the bit map memory 551 is displayed on the monitor 115 by the display interface 552.

d) In order to display a color image on the monitor display 115 as a preview image, however, the color image data stored by the user's memory 530 is processed by the preview function 542 and written in the bit map memory 551. After that the color image stored by the bit map memory 551 is displayed on the monitor 115.

At this time, the preview function 542 is operated by the print function 573.

e) In order to print a color image based on the color image data 531 stored by the user's memory 530, the color image data 531 is converted by the print function and driver 573 and is written into print buffer memory 574. The color image data written in the print buffer memory 574 is output to the printer 120 through the printer interface 575.

At this time, the system printer selector 580 changes over between the preview function 542 and printer interface 575 in accordance with the characteristics of the selected printer.

System Printer Selector

Figure 6:
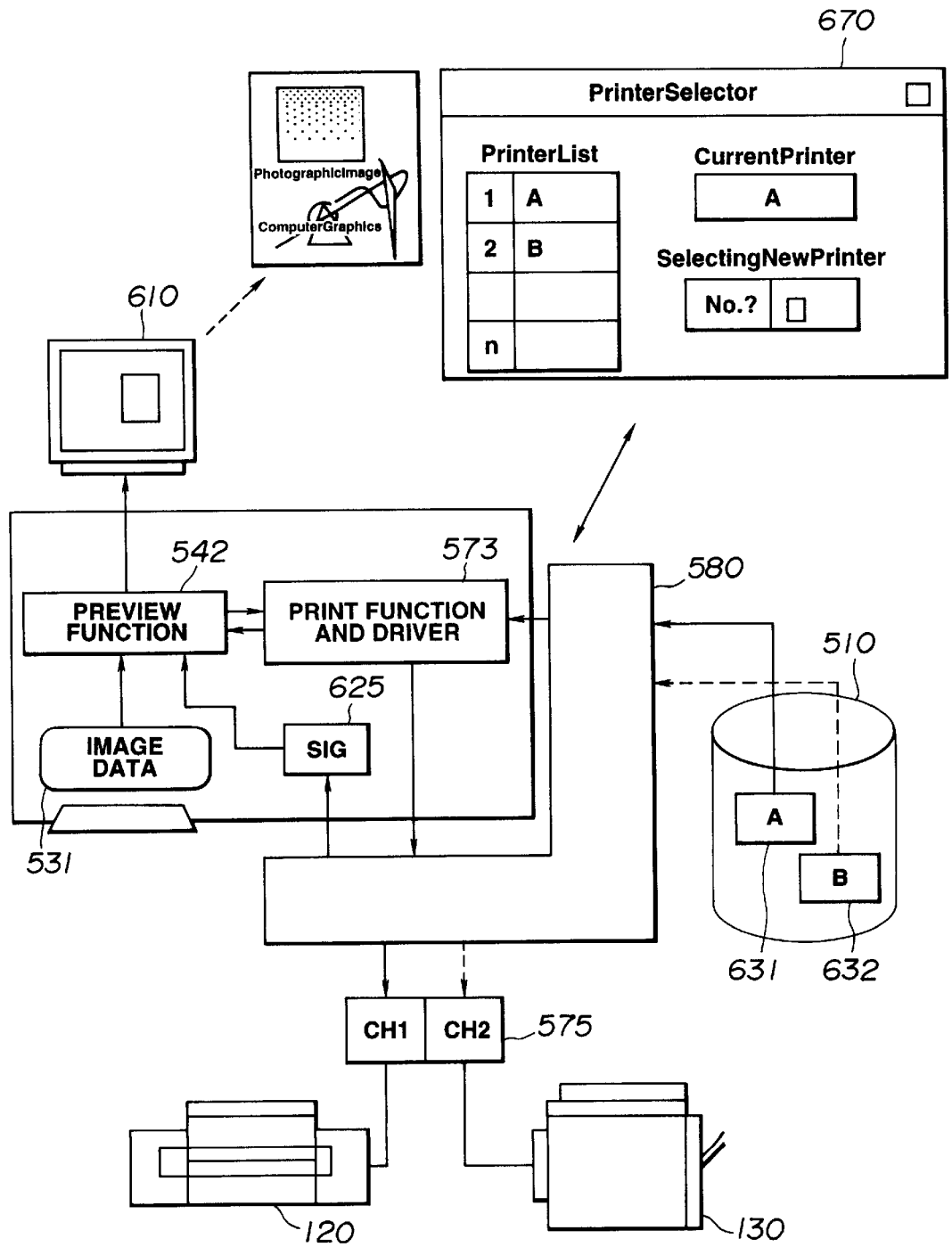
FIG. 6 is a simplified flow-chart for explaining the operation of the system printer selector 580.

FIG. 6 is a simplified flowchart for explaining the operation of the system printer selector 580 shown in FIG. 5. Referring to FIG. 6, file system 510 contains not only the color image data but also a printer driver 631 for the color ink jet printer 120, and a printer driver 632 of the color laser printer 130. The color ink jet printer 120 is connected at CH1 within the printer interface 575. The color laser printer 130 is connected at CH2 within the printer interface 575.

The operator of the host computer 110 selects a printer by selecting one of the printers on the Printer List displayed on a window of the monitor 413 of the computer 110 shown in FIG. 2. The Printer List is shown at 670 in FIG. 6.

The system printer selector 580 operates as follows.

a) To load a printer driver stored in the file system 510 into print function and driver 573 in accordance with a selected printer.

b) To change channels in the printer interface 575 in accordance with the selected printer.

c) To transmit a signal to the preview function 542 so that the preview function recognizes the printer driver stored by the print function and driver 573 to the selected printer. A solid line in FIG. 6 represents a data flow when the color ink jet printer 120 is selected.

The printer driver A stored in the file system 510 is loaded into the print function and driver 573, and channel CH1 of the printer interface is selected.

The preview function 542 can access the print function and driver 573 based on the signal 625. To make a preview image corresponding to the color image data 531, the preview function 542 calls the print function driver 573, and function 542 makes a binarized image using binarizing process 36 shown in FIG. 4.

When the color laser printer 130 is selected, the printer driver B stored in the file system 510 is loaded into the print function and driver 573, and channel CH2 of the printer interface is selected.

The preview function 542 can access print function and driver 573 based on the signal 625. To make a preview image corresponding to the color image data 531, the preview function 542 calls the print function and driver 573, and function 542 makes a tone (binary) processed image by a tone process corresponding to a tone process that is used in the color laser printer 130.

According to the present embodiment, the preview function 542 selects the print function and driver in accordance with a printer selected between the printer 120, which is a binary output device, and the printer 130, which is a multivalue output device, and therefore, the preview image can be more precise.

Second Embodiment

Figure 7:
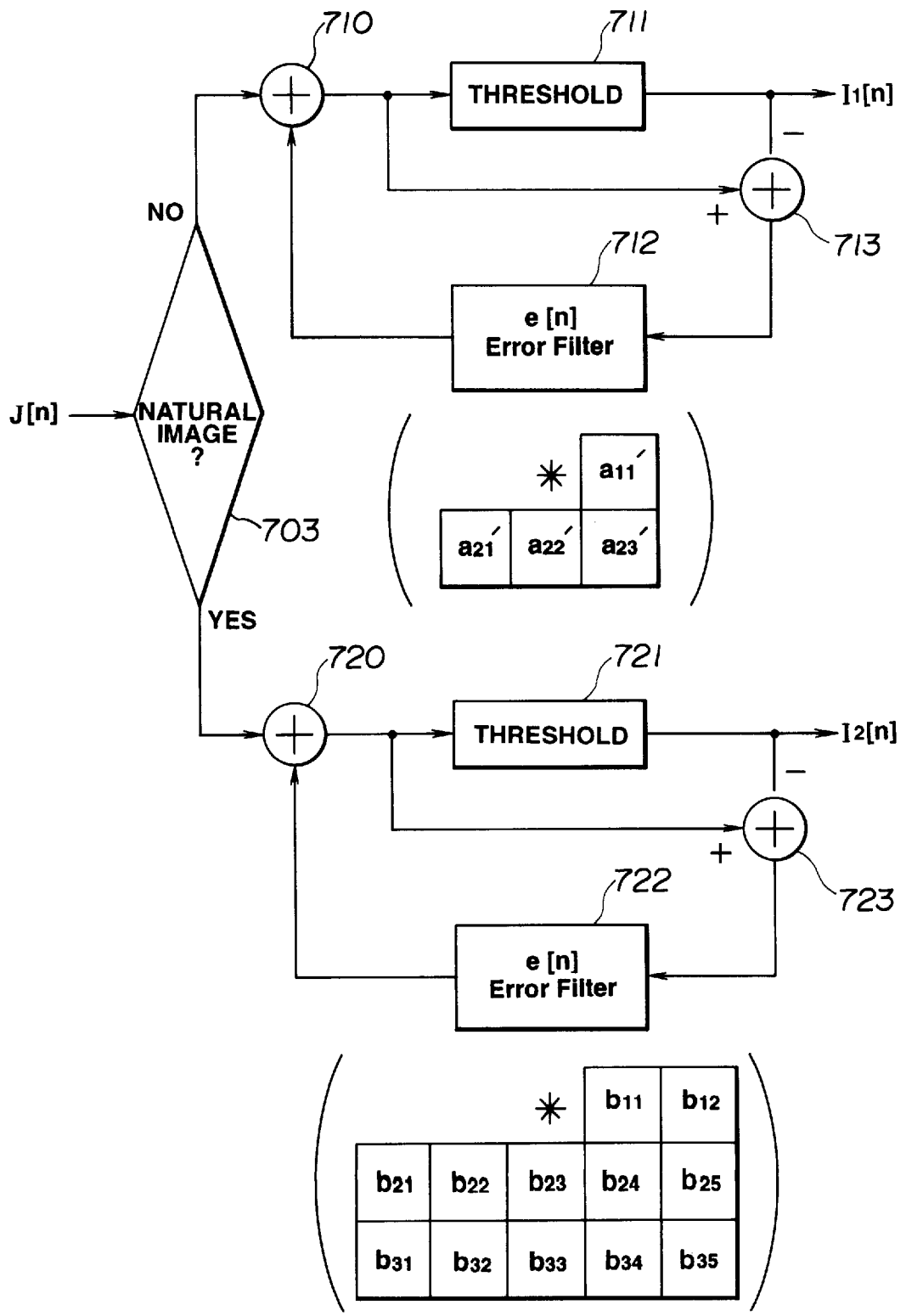
FIG. 7 is a schematic block diagram for explaining a changeover of the error filter used in binarizing.

FIG. 7 is a schematic block diagram for explaining a changeover of the error filter that is used in binarizing process 36 shown in FIG. 4. The process shown in FIG. 7 can be performed by software or hardware.

Referring to FIG. 7, the type of data J[n] being input is discriminated by block 703 as between natural image and non-natural image (artificial image, e.g., a graphic object or string), and after that an appropriate binarizing process is performed in accordance with the discrimination performed by the block 703.

710 and 720 are adders. 711 and 721 are binarizers using a threshold level. 712 and 722 are error filters for diffusing an error determined by subtracters 713 and 723, which subtract the binarization results from the signals output by adders 710 and 720, respectively.

Blocks 710 to 713 include the error filter 712, in which the number of picture elements to which error is diffused, is small. In this embodiment, for example, the error filter 712 comprises four coefficients a11, a21, a22 and a23. Blocks 720 to 723 include the error filter 722, in which the number of picture elements to which error is diffused, is larger. In this embodiment, for example, the error filter 722 comprises twelve coefficients b11, b12, b21, b22, b23, b24, b25, b31, b32, b33, b34 and b35.

A sharpened image (in which the high frequency component of the image is relatively large) and a smoothed image (in which the high frequency component of the image is relatively small) are selectively obtained by adjusting the coefficients a11, a21, a22, and a23 and b11, b12, b21, b22, b23, b24, b25, b31, b32, b33, and b34. The printing data 37 is produced in accordance with the type of input image as mentioned above.

The preview function of the present embodiment will now be explained. This preview function is a modification of the preview function shown in FIG. 5.

Figure 8:
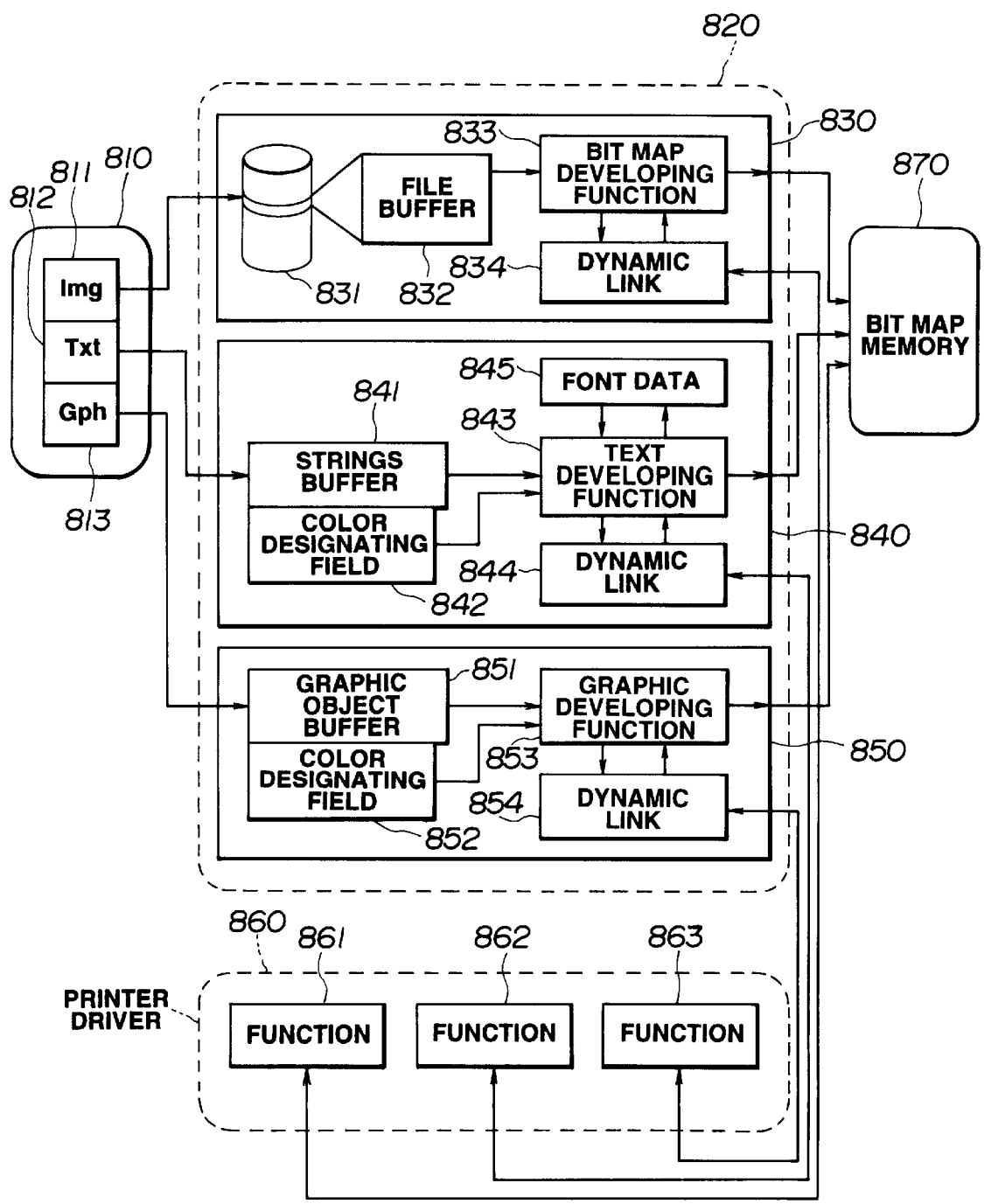
FIG. 8 is a schematic diagram of a part of a second embodiment of the invention.

FIG. 8 is a schematic diagram of a part of the present embodiment.

Referring to FIG. 8, 810 is color image data corresponding to the color image data 531 shown in FIG. 5.

The color image data 810 comprises three objects: image file name 811, a string object (e.g., text) 812, and a graphic object 813. These objects are processed respectively by modules 830, 840 and 850 comprised in preview function 820, and are written into a bit map memory 870 that corresponds to element 551 shown in FIG. 5.

The modules 830, 840 and 850 produce a proper image by using functions 861, 862 and 863 provided in printer driver 860 that corresponds to element 573 shown in FIG. 5. These functions 861, 862 and 863 perform a binarizing process by using the error diffusion method. The error filters used in the functions 861, 862 and 863 are different from each other, as described in connection with FIG. 7.

It will be appreciated that the error filters used by functions 861, 862 and 863, respectively, differ from each other in a manner that corresponds to the differences between the error filters used to process natural image, text, and graphics objects, resepctively, for printing. For example, just as the natural-image error filter shown at the bottom of FIG. 7 has more, but smaller, coefficients than the text/graphics filter shown above it, so the preview error filter used for natural image will have more, but smaller, coefficients than the preview error filters used with text and with graphics; especially, the preview error filters for text and for graphics are quite similar. In general, if the size of a given preview error filter is small compared to the other preview error filters, then the corresponding output error filter will also be small, compared to the other output error filters.

The module 830 develops the image object on the bit map memory 870. The module 830 transmits image data stored in the file buffer 832 by using function 861, called by a dynamic link 834.

The module 840 develops the string object 812 on the bit map memory 870. The module 840 transmits the string object 812 to a string buffer 841 and a color designating field 842. The text developing function 843 develops the string object using font data 845, and binarizes the developed image by using the function 862, called by a dynamic link 844.

The module 850 develops the graphic object 813 on the bit map memory 870. The module 850 transmits the graphic object 813 to a graphic object buffer 851 and a color designating field 852.

The graphic developing function 853 develops the graphic object 813 and binarizes the developed image by using the function 863, called by a dynamic link 854.

The present embodiment, thus, automatically distinguishes among different kinds of image data and processes each kind using the most suitable of the several available error filters. Similarly, the error filter chosen for use in preparing the preview image, is also selected according to the kind of image data. As a result, the preview image provides an accurate representation of the colors that will actually be printed.

Third Embodiment

Figure 9:
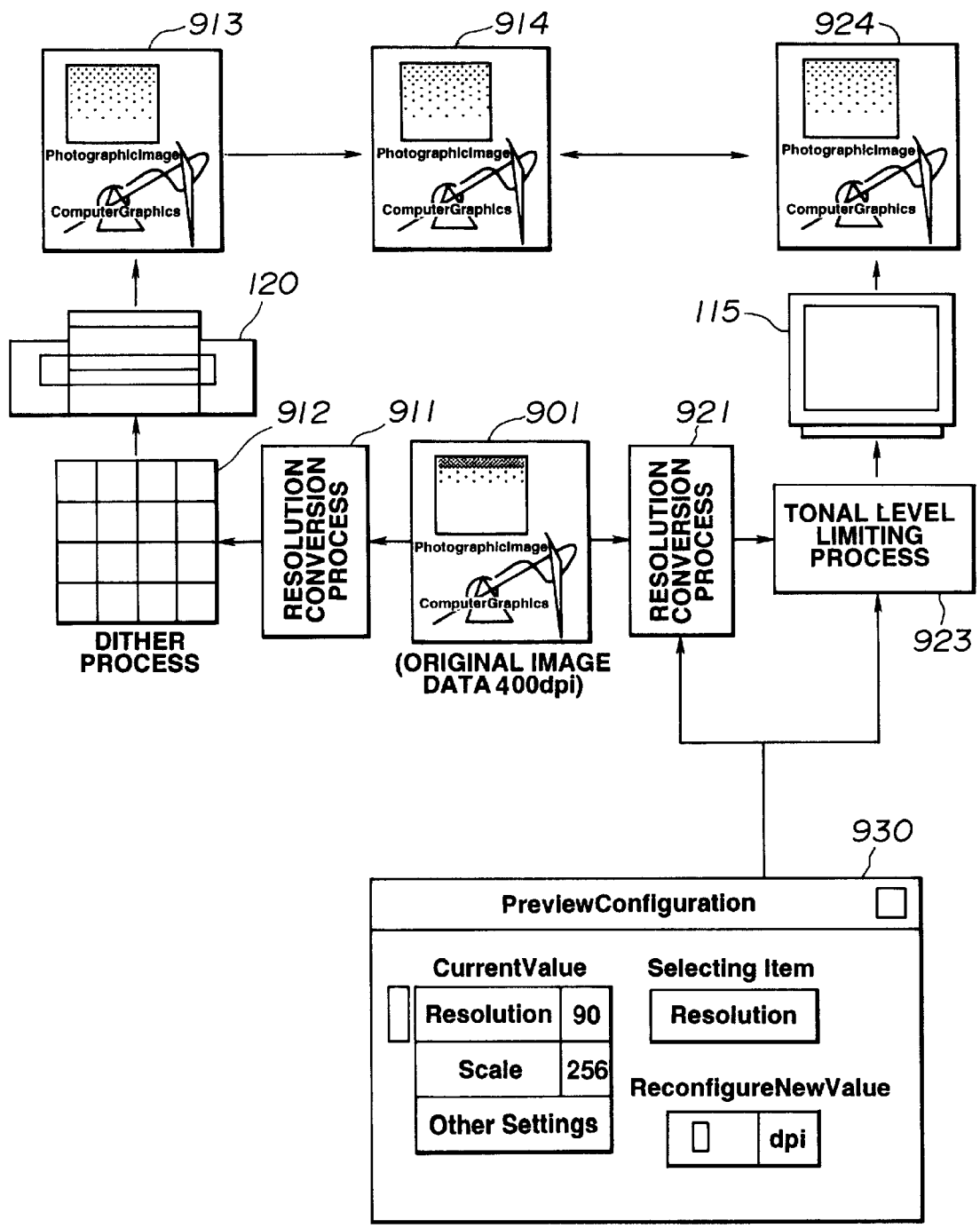
FIG. 9 is a schematic diagram of a third embodiment of the invention.
Figure 10:
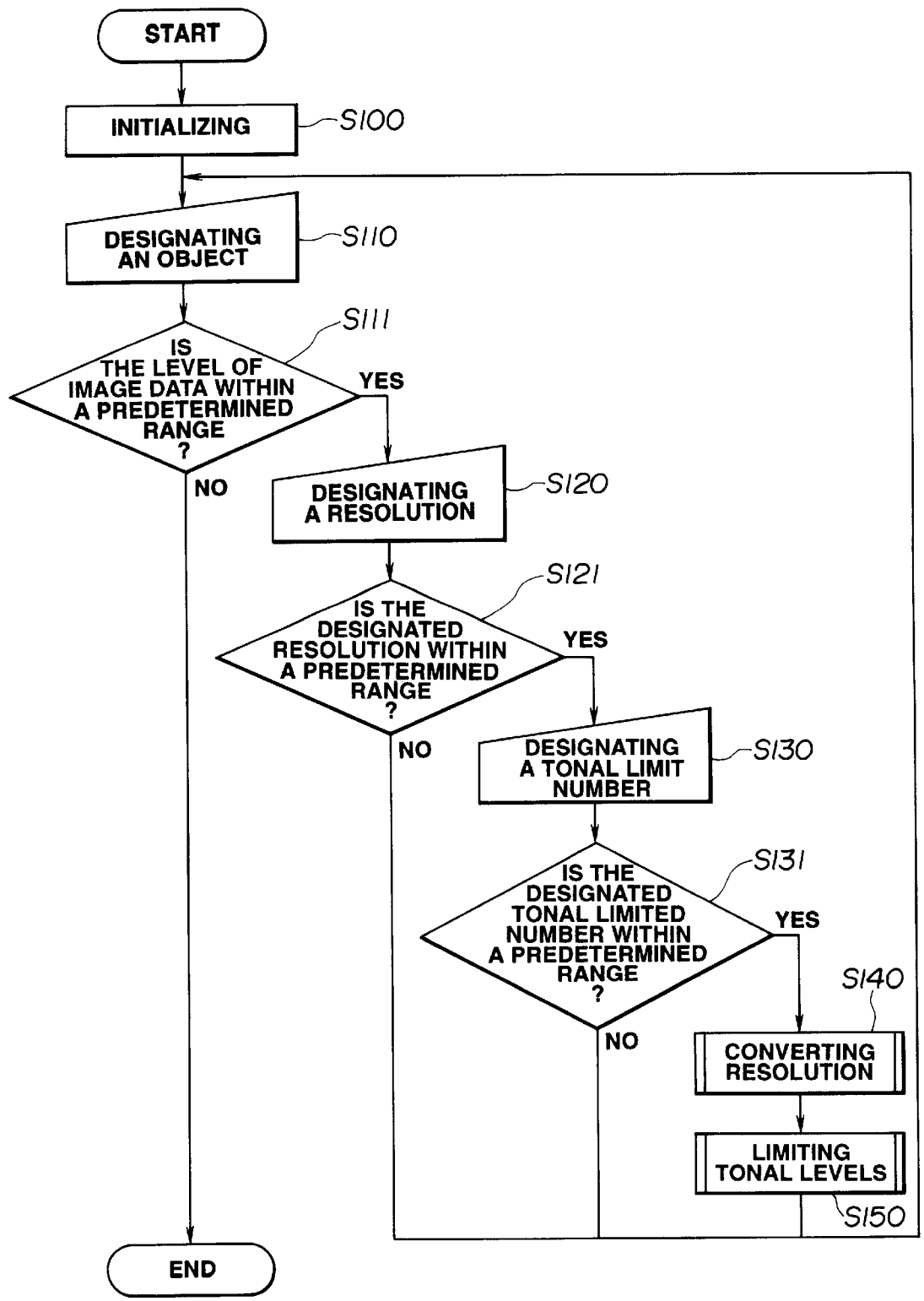
FIG. 10 is a flowchart for explaining the operation of the configuration process.

The third embodiment will be now explained using FIG. 9 and FIG. 10.

In this embodiment, a preview image is produced based on the difference in appearance between a printed image and a monitor image.

Referring to FIG. 9, 901 is original image data having a resolution of 400 dpi. 911 is a resolution conversion process for converting the original image data to a resolution of 360 dpi, which is equal to that of the printer 120. 912 is a dither process for binarizing the printer-resolution image data output by the resolution conversion process 911. The dither process in this embodiment uses a 4×4 threshold matrix.

913 is a printed image produced by printer 120. 921 is a resolution conversion process for converting the resolution 400 dpi of the original image data 901 in accordance with a given instruction. 923 is a tonal level limiting process for limiting tonal level in accordance with a given instruction. 924 is a displayed image on the display monitor 115. 930 is a preview configuration process for controlling the resolution conversion process 921 and the tonal level limiting process 923 in accordance with an operator's instruction. The chart shown in the preview configuration process 930 is a display on the host computer 410. Thus, the operator can enter an instruction for selecting resolution data, and/or data relative to the tonal level limiting process, to the computer 410 while viewing that display.

In the above explained embodiment, the resolution of the printed image 913 is less than 360 dpi (and possibly as low as 90 dpi) because the image data has been dither processed using a 4×4 threshold matrix, as mentioned above. The guaranteed number of tonal levels of the printed image 913 is 16 because the 4×4 threshold matrix is used.

Therefore, the resolution of the original image data 901 is reduced to, e.g., 90 dpi, while the tonal level limiting process 923 limits the tonal levels of the original image data to, e.g., 16 levels in this embodiment (this limit may be termed a tonal limiting number").

The image processed by the resolution conversion process 921 and the tonal level limiting process 923 may have an appearance that is similar in some ways to an appearance of the printed image 913, but there will be a difference because of a response characteristic to spatial frequency. The reason for this mismatch is that the image processed by the resolution conversion process 911 includes a frequency component that is higher than can be expressed 90 dpi. Therefore, in this embodiment, the preview configuration process 930 is provided to control the resolution conversion process 921 and the tonal level limiting process 923.

An operation of the configuration process 930 is now explained, using FIG. 10.

FIG. 10 is a flowchart for explaining the operation of the configuration process 930. S100 is an initializing step for initializing the operation of the tonal level limiting process. S110 is a step for designating the kind of object to be processed (as, a natural or halftone image, characters, or drawings). S111 is a step for discriminating whether a level of image data that corresponds to the object designated is within a predetermined range. If so, the flow continues to step S120, and if not, returns to step S110.

In step S120, a resolution is designated. In step S121, a determination is made as to whether that resolution is within a predetermined range. If so, the flow proceeds to a step S130 and, if not, returns to step S110.

Step S130 is a step for inputting the tonal limit number designated by the operator. Step S131 is a step for discriminating whether the tonal limited number is within a predetermined range. If so, the flow continues to step S140 and, if not, returns to step S110.

Step S140 is a step for performing resolution conversion by process 921 in accordance with the resolution designated in step S120. S150 is a step for performing tonal limiting by process 923 in accordance with the designated tonal limit number.

The tonal limiting process 923 performs its process by linearly quantizing color image data which has been resolution-converted, and outputs quantized color image data to the monitor 115. As described above, this results in a preview image similar to the printed image that will be obtained if printing is ordered.

Fourth Embodiment

Figure 11:
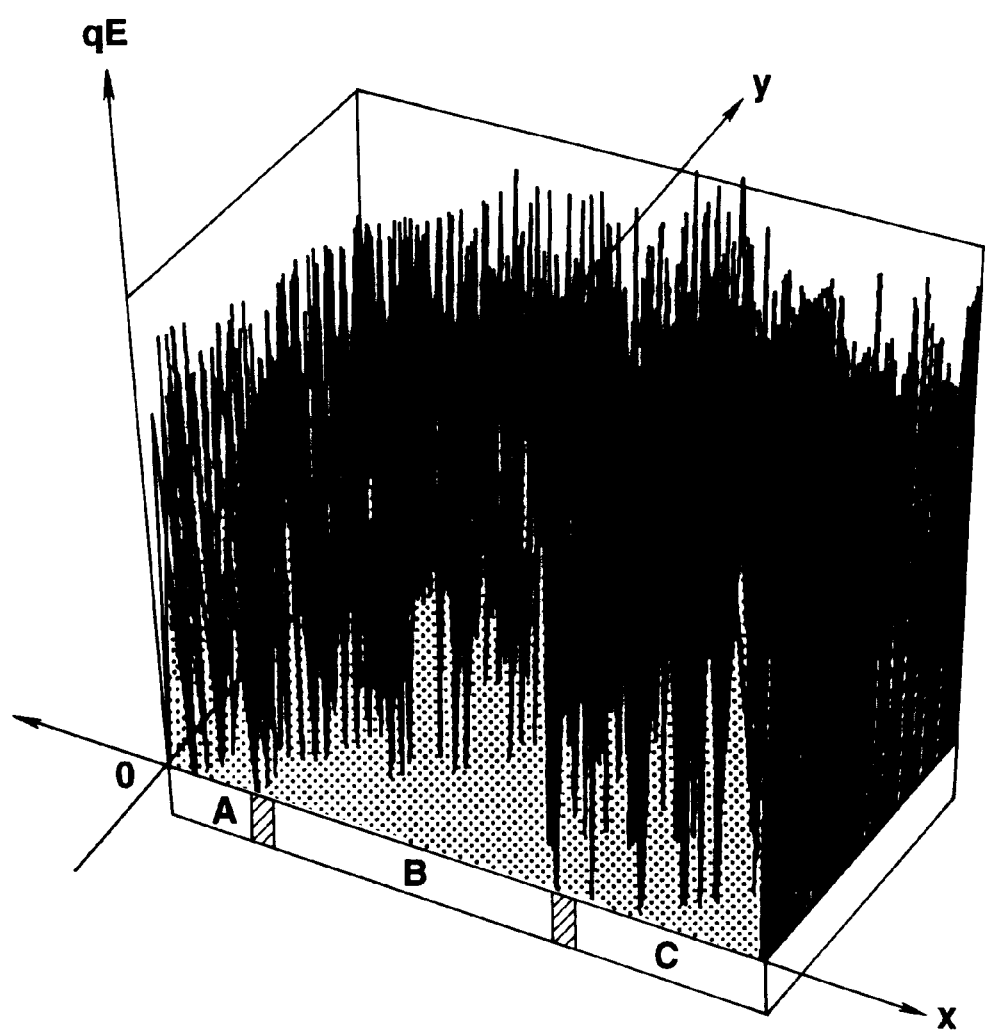
FIG. 11 is a diagram showing a quantization error generated by the binarizing process.

The fourth embodiment will be explained using FIG. 11, FIG. 12 and FIG. 13.

In the third embodiment, the resolution conversion process 921 and the tonal level limiting process 923 are controlled in accordance with instructions entered by the operator. However, in the present embodiment, the resolution conversion process 921 and the tonal level limiting process 923 are controlled automatically.

Before description of the structure of the present embodiment, some comments on generation of quantization errors by the binarizing process will useful. FIG. 11 is a chart showing quantization errors generated by the binarizing process. In FIG. 11 "O" represents the origin. The X axis and Y axis represent the horizontal direction and vertical direction in the image being binarized, respectively. The qE axis represents a quantization error magnitude.

In this example, the image to be binarized has edges at the borders between A and B and between B and C. (A, B, C are only symbols for easy understanding.) There are some points whose quantization errors are nearly zero in zone A and in zone C. There are no such points, however, in zone B.

The visual impressions that will be made by the binarized image in zone A, zone C and zone B are different from each other. Therefore, in the present embodiment, the preview image is produced by the following steps.

(1) A quantization error that is generated by the binarizing process in each area of the image, is detected.

(2) The preview image is produced based on the detected quantization error.

Figure 12:
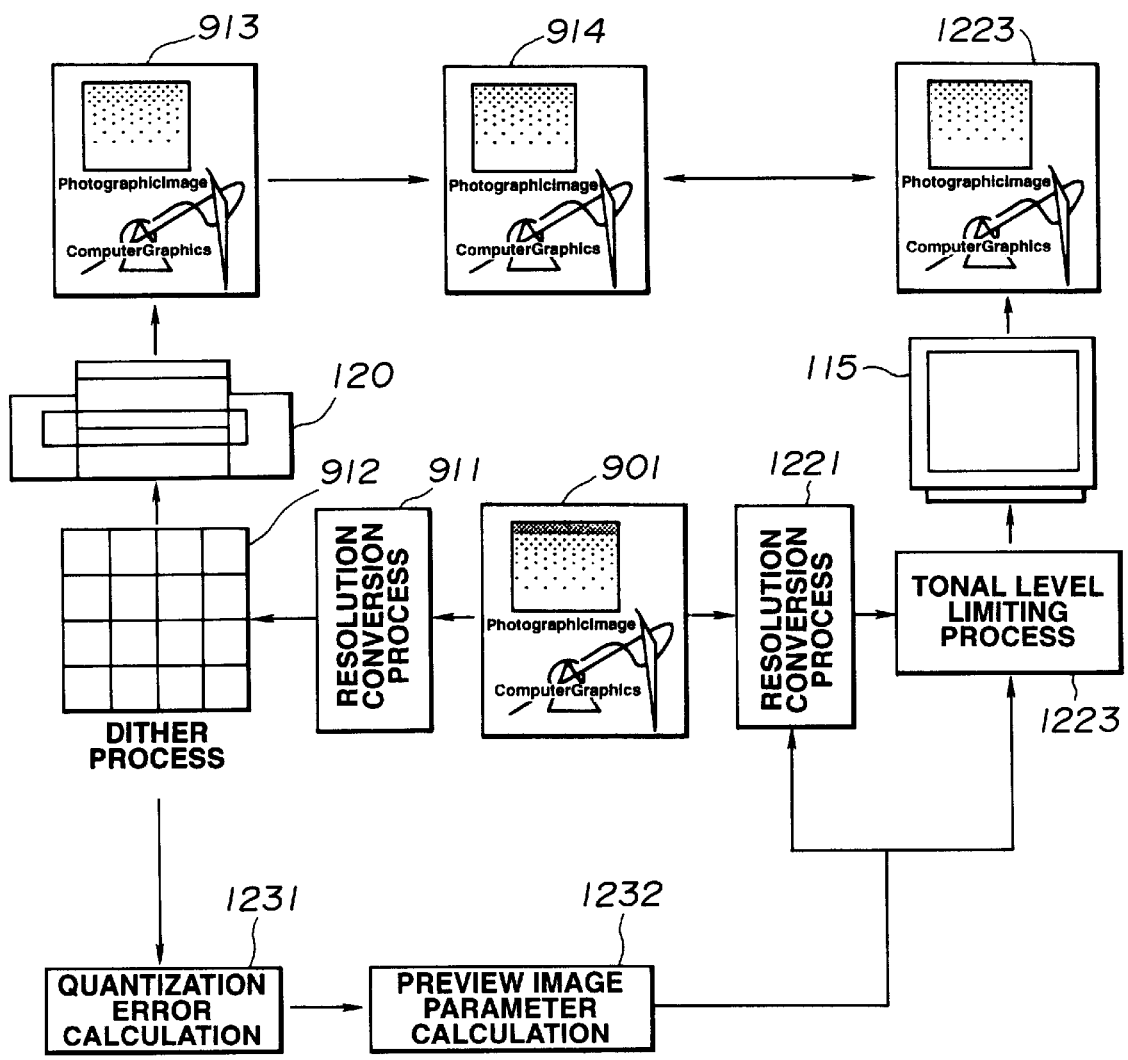
FIG. 12 is a schematic diagram of a fourth embodiment of the invention, for explaining a relation between the printed image and the monitor image.

FIG. 12 is a schematic diagram of the fourth embodiment, for explaining the relation between the printed image and the monitor image (in this Figure, those elements that operate like elements shown in FIG. 9 have the same number as in FIG. 9). 1231 is a quantization error calculating device, for calculating a quantization error for each area of the image to be processed. 1232 is a preview image parameter producing device for producing a parameter that controls the resolution conversion process 1221 and the tonal level limiting process 1223.

The preview image parameter serves to reduce the number of tonal levels of the image when the quantization error is large. This is done because if the quantization error is large, the impression made by the binarized image is not smooth.

Figure 13:
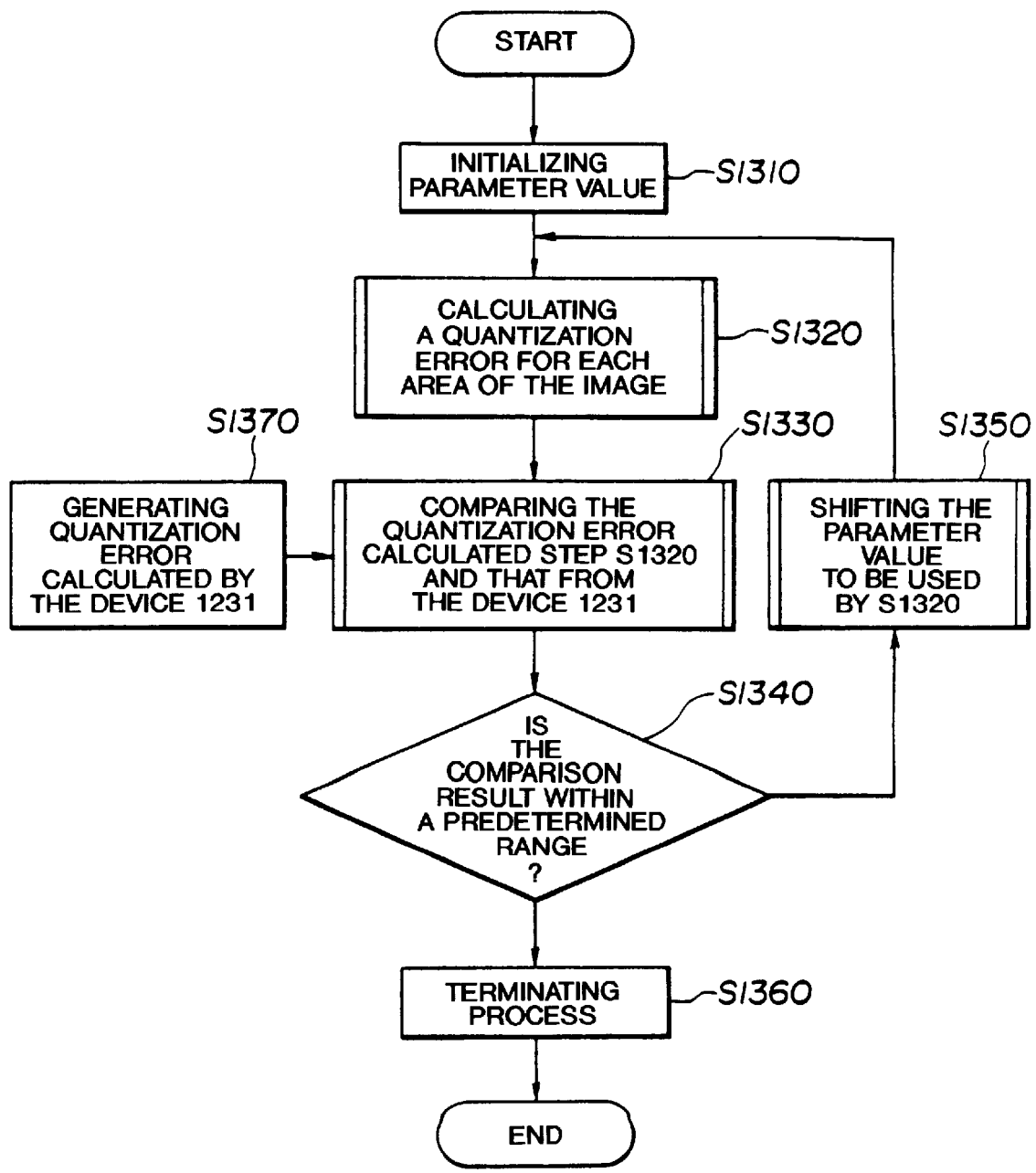
FIG. 13 is a flowchart for explaining the operation of the parameter producing device.

The operation of the preview image parameter producing device 1232 is now explained using FIG. 13.

FIG. 13 is a flowchart for explaining the operation of the parameter producing device 1232. S1310 is an initializing step for initializing a parameter to be output by the producing device 1232. S1320 is a step for calculating a quantization error for each area of the image when the resolution conversion process 921 and the tonal limiting process 923 operate in accordance with the parameter value set initially in by step S1310.

S1330 is a step for comparing the quantization error calculated in step S1320 and the quantization error calculated by the device 1231 for each area.

S1340 is a step for discriminating whether the parameter previously used in step S1320 is good or not, in accordance with a comparison result obtained in step S1330. If the existing parameter is satisfactory, the flow continues to step S1360, and if it is not, the flow proceeds to step S1350. S1350 is a step for shifting the value of the parameter to be used in step S1320. After step S1350, the flow returns to step S1320.

S1360 is a step for controlling the resolution conversion process 1221 and the tonal level limiting process 1223 in accordance with the parameter that is discriminated as "good" in step S1340.

In this manner, the resolution conversion process 1221 and the tonal level limiting process 1223 are automatically controlled in accordance with the characteristics of the image, so that a more precise preview image is obtained.

In this embodiment, resolution and tonal limit number are both controlled, but either one may be used for this purpose without the other, in the present invention. Also, the present invention can be applied not only to a color printer but also to a monochrome printer. In addition, this invention can be applied not only to a color monitor but also to a monochrome monitor.

Moreover, this invention is applicable not only to systems implemented using computers and software, but also to hardware systems.

The quantization error treated in the manner described above may comprise errors produced by a dither method or by an error diffusion method, or any other quantization error.

According to the present invention, a precise preview image can be obtained because the preview image is produced based on quantization errors produced in quantizing the image data.

The individual components shown in outline or designated by blocks in the drawings are all well known in the pertinent arts, and their specific construction and operation are not critical to the operation or best mode for carrying out the invention.

While the present invention has been described with respect to what are at present the preferred embodiments, it is to be understood that the invention is not limited to those embodiments. To the contrary, the invention includes various modifications and equivalent arrangements included within the spirit and scope of the appended claims. The scope of the following claims is to be accorded the broadest interpretation so as to encompass all such modifications and equivalent structures and functions.

What is claimed is:

1. An image processing method for obtaining, on a monitor, a preview image that corresponds to an output image to be produced based on given image data by an image producing device, comprising the steps of:

inputting the image data; and obtaining preview image data to produce the preview image by performing a preview process including a resolution conversion process and a tonal level limiting process corresponding to quantization processing by the image producing device, wherein the preview image expresses a quantization error due to the quantization processing.

2. An image processing method according to claim 1, wherein the given image data is color image data.

3. An image processing method according to claim 1 wherein the image producing device is a color image producing device.

4. An image processing method according to claim 1, wherein the image producing device is a binary-value printer.

5. An image processing method according to claim 1, wherein the image producing device is a multivalue printer.

6. An image processing method of obtaining, on a monitor, a preview image that corresponds to an output image to be produced based on given image data by an image producing device, comprising the steps of:

inputting the image data;

obtaining preview image data to produce the preview image by performing a preview process including a resolution conversion process and a tonal level limiting process;

setting a condition of the resolution conversion process and a condition of the tonal level limiting process based on a manual instruction by a user;

quantizing the image data and forming the output image based on the quantized image data; and expressing quantization error in the preview image.

7. An image processing method according to claim 1, further comprising the step of producing the preview image in accordance with the preview image data obtained in said obtaining step.

8. An image processing method according to claim 1, wherein said obtaining step is performed using a system including a computer and software.

9. An image processing apparatus for obtaining, on a monitor, a preview image that corresponds to an output image to be produced based on given image data by an image producing device, comprising:

inputting means for inputting the image data;

obtaining means for obtaining preview image data to produce the preview image by performing a preview process including a resolution conversion process and a tonal level limiting process a corresponding to quantization processing by the image producing device, wherein the preview image expresses a quantization error due to the quantization processing.

10. An image processing apparatus according to claim 9, wherein the given image data is color image data.

11. An image processing apparatus according to claim 9 wherein the image producing device is a color image producing device.

12. An image processing apparatus according to claim 9, wherein the image producing device is a binary-value printer.

13. An image processing apparatus according to claim 9, wherein the image producing device is a multivalue printer.

14. An image processing apparatus for obtaining, on a monitor, a preview image that corresponds to an output image to be produced based on given image data by an image producing device, comprising:

inputting means for inputting the image data;

obtaining means for obtaining preview image data to produce the preview image by performing a preview process including a resolution conversion process and a tonal level limiting process;

setting means for setting a condition of the resolution conversion process and a condition of the tonal level limiting process based on a manual instruction by a user;

quantizing means for quantizing the image data and means for forming the output image based on the quantized image data; and means for expressing quantization error in the preview image.

15. An image processing apparatus according to claim 9, further comprising producing means for producing the preview image in accordance with the preview image data obtained by said obtaining means.

16. An image processing apparatus according to claim 9, wherein said obtaining means includes computer means and software.

17. An image processing method according to claim 1, wherein said image processing method further comprises the steps of:

setting a condition of the resolution conversion process and a condition of the tonal level limiting process based on a manual instruction by a user.

* * * * *

UNITED STATES PATENT AND TRADEMARK OFFICE
CERTIFICATE OF CORRECTION

PATENT NO. : 6,108,009
DATED : August 22, 2000
INVENTOR(S) : Naoyuki Nishikawa

It is certified that error appears in the above-identified patent and that said Letters Patent is hereby corrected as shown below:

COLUMN 5

Line 62, "b11, b12" numbers should be bold face;

COLUMN 7

Line 38, "number")." should read --number).--;

COLUMN 10

Line 46, "a" should be deleted.

Signed and Sealed this

Eighth Day of May, 2001

Attest:

NICHOLAS P. GODICI

Attesting Officer  Acting Director of the United States Patent and Trademark Office